United States Patent [19]

Perego et al.

[11] Patent Number: 5,608,134
[45] Date of Patent: Mar. 4, 1997

[54] PROCESS FOR PREPARING AN EFFECTIVE CATALYST FOR n-PARAFFINS HYDROISOMERIZATION

[75] Inventors: Carlo Perego, Carnate; Giuseppe Bellussi, Piacenza; Vincenzo Calemma, San Donato Milanese, all of Italy

[73] Assignee: Eniricerche S.p.A., Milan, Italy

[21] Appl. No.: 456,804

[22] Filed: Jun. 1, 1995

Related U.S. Application Data

[62] Division of Ser. No. 124,203, Sep. 2, 1993, Pat. No. 5,444,032.

[30] Foreign Application Priority Data

Sep. 29, 1992 [IT] Italy .................. MI92A2242

[51] Int. Cl.⁶ ......................................... C07C 5/13

[52] U.S. Cl. ...................... 585/750; 585/739; 585/751; 502/235

[58] Field of Search ......................... 585/739, 750, 585/751

[56] References Cited

U.S. PATENT DOCUMENTS 5,444,032  8/1995  Perego et al. .

*Primary Examiner*—Asok Pal
*Assistant Examiner*—Bekir L. Yildirim
*Attorney, Agent, or Firm*—Oblon, Spivak, McClelland, Maier & Neustadt, P.C.

[57] ABSTRACT

An improved process for preparing a difunctional catalyst active in the hydroisomerization of long-chain normal paraffins is disclosed, which is constituted by an amorphous silica-alumina gel and one or more metals belonging to Group VIIIA,

8 Claims, No Drawings

PROCESS FOR PREPARING AN EFFECTIVE CATALYST FOR N-PARAFFINS HYDROISOMERIZATION

This is a Division, of application Ser. No. 08/124,203 filed on Sep. 21, 1993, U.S. Pat No. 5,444,032.

The present invention relates to an improved process for preparing a difunctional catalyst which is constituted by an amorphous silica-alumina gel and one or more metals belonging to Group VIIIA, and is effective in the hydroisomerization of long-chain normal paraffins containing more than 15 carbon atoms.

The process of isomerization of waxes in order to yield base oils for lubricant oils characterized by a low pour point and a high viscosity index, requires that suitable catalysts are used.

In-fact, the waxes, which are mainly constituted (>80% by weight) by n-paraffins containing more than 15 carbon atoms, and are solid substances at room temperature, must be converted into the corresponding branched isomers having a higher melting point as compared to the corresponding linear structures.

For example, n-$C_{16}$ paraffin has a melting point of 19° C., whilst its isomer 5-methylpentadecane melts at −31° C.

However, an effective hydroisomerization catalyst should keep any possible cracking and hydrocracking reactions, which are catalysed by the same acidic sites and have, as intermediates, the same carbocations useful for hydroisomerization, to a minimum. These secondary reactions lead to the degradation of the molecule, with less valuable, lighter, products being formed, which must be removed from the end product because they would increase the volatility thereof; this obviously constitute a burden for the overall process.

For this process, difunctional catalysts were developed, i.e., catalysts containing both acidic sites and hydro-dehydrogenation active sites. The acidity is given to the catalyst by the selected carrier type and its function exactly is the isomerizing property.

The hydro-dehydrogenating activity is supplied to the catalyst by the deposited metal phase, the function of which is also of keeping the cracking reactions to the minimum.

It was demonstrated (J. F. Le Page, Applied Heterogeneous Catalysis, Ed. Technip, Paris, 1987, 435–466) that, with the hydrogenating activity being the same, the more selective catalysts are those in which the carrier displays a controlled acidity, so as to maximize the isomerization of n-paraffins over cracking. However, inasmuch as the cracking reactions follow the isomerization, the maximal isomerization selectivity is obtained at low conversion levels (G. Froment et al., Ind. Eng. Chem. Prod. Res. Dev., 1981, 20, 654–660).

The effectiveness of several catalysts can be evaluated on such model compounds as n-paraffins, by measuring the selectivity thereof, i.e, the ratio of the resulting isomerization products to the cracking products at a given n-paraffin conversion rate.

In U.S. Pat. No. 5,049,536, an amorphous and microporous gel of silica and alumina is disclosed, which is active in the processes of isomerization, alkylation, dewaxing and dimerization of linear olefins. Typical characteristics of such a material are its high acidity, as compared to conventional amorphous silica-aluminas and the very narrow distribution of the average pore diameter.

U.S. patent application Ser. No. 08/099,650 filed on Jul. 30, 1993 discloses a catalyst which constituted by a silica and alumina gel and one or more metals belonging to Group VIIIA, useful in the hydroisomerization reaction. A process is furthermore disclosed for preparing the above said catalyst by starting from the silica-alumina gel disclosed in U.S. Pat. No. 5,049,536, on which the metal phase is subsequently deposited by aqueous impregnation, or ion exchange.

The present Applicant found now, according to the present invention, an improved and simplified process for preparing a gel containing one or more metals of Group VIIIA.

In accordance therewith, the present invention relates to a process for preparing difunctional catalysts constituted by:

(a) an X-ray amorphous silica-alumina gel having a molar ratio of $SiO_2:Al_2O_3$ comprised within the range of from 30:1 to 500:1, a porosity comprised within the range of from 0.3 to 0.6 ml/g, a diameter of the pores prevailingly comprised within the range of from 10 to 30 Angstroms;

(b) one or more metals belonging to Group VIIIA, preferably platinum and/or palladium, in amounts comprised within the range of from 0.05 to 5% by weight; characterized in that:

aqueous solution of:
  (1) a tetraalkylammonium hydroxide (TAA-OH), wherein by "alkyl" an alkyl radical selected from ethyl, n-propyl or n-butyl is meant;
  (2) a soluble aluminum compound capable of undergoing hydrolysis yielding $Al_2O_3$;
  (3) a noble metal (M) complex or salt;
  (4) a soluble silicon compound capable of
  undergoing hydrolysis yielding $SiO_2$; is prepared, with the amount of the constituents in said solution being such as to comply with the following molar ratios:

$SiO_2:Al_2O_3$ comprised within the range of from 30:1 to 500:1, preferably of from 50:1 to 300:1;

TAA-OH:$SiO_2$ comprised within the range of from 0.05:1 to 0.2:1;

$H_2O:SiO_2$ comprised within the range of from 5:1 to 40:1, preferably of from 10:1 to 25:1;

M:$SiO_2$ comprised within the range of from 0.0002:1 to 0.05:1, preferably of from 0.003 to 0.01;

the resulting solution heated in order to cause it to undergo gelation;

the resulting gel is dried and calcined under an inert atmosphere and then under an oxidizing atmosphere.

As disclosed U.S. Pat. No. 5,049,536, it is critical that the alkyl radical of tetraalkylammonium hydroxide (1) is selected from ethyl, n-propyl, n-butyl.

The preferred aluminum compounds (2) are aluminum trialkoxides such as aluminum tri-n-propoxide and tri-iso-propoxide.

The selection of noble metal salts or complexes (3), preferably of platinum or palladium, is not critical, provided that they are soluble enough in the reaction environment. For example, $H_2PtCl_6$, $Pt(NH_3)_4(OH)_2$, $Pt(NH_3)_4Cl_2$, $Pd(NH_3)_4(NO_3)_2$, $Pd(CH_3COO)_2$ may be indifferently used.

The preferred silicon compounds (4) are tetraalkyl silicates, such as tetraethyl silicate (TES).

The order of addition of the four constituents of the aqueous solution is not critical. However, forming an initial aqueous solution containing the tetraalkylammonium hydroxide and the soluble aluminum compound is preferred. Subsequently, to this solution the noble metal compound (salt or complex) (3) and the soluble silicon compound (4) are added, preferably in the above specified order.

The temperature at which the reactants 1–4 are mixed with each other may be comprised within the range of from 30° to 70° C., with the proviso that the temperature should be such as to make it possible a homogeneous solution to be obtained. In order to prevent that problems of insufficient solubility may arise, the above said reactants are preferably mixed at a temperature comprised within the range of from 50° to 65° C.

The resulting solution is gelled by heating it at a temperature comprised within the range of from 50 to 70° C., preferably at a temperature of from 55° to 65° C. The necessary time for the gelation to proceed to completion varies, mainly, but not exclusively, as a function of temperature and reactants' concentrations. Normally, the above said gelling time is comprised within the range of from 15 minutes to 3 hours, typically of from 25 to 60 minutes.

The resulting gel is submitted to drying at a maximal temperature of 150° C., preferably on the order of 90°–120° C., in the presence of an inert gas or under a reduced pressure, for a long enough time to remove water to a complete or substantially complete extent.

The so dried gel is submitted to calcination at a temperature comprised within the range of from 250° to 600° C., preferably of from 300 to 550° C. The calcination can be carried out in 2 steps, a first step under an inert atmosphere, and a second step under an oxidizing atmosphere. The calcination time, excluding the necessary time to reach the desired temperature, is usually comprised within the range of from 2 to 20 hours, typically of from 3 to 10 hours.

The catalysts obtained by means of the process according to the present invention, amorphous on X ray analysis, display a uniform and controlled porosity and furthermore have a surface area comprised within the range of from 500 to 1,500 m$^2$/g, with the larger values being obtained at higher $SiO_2:Al_2O_3$ ratios.

They can be used as such, or in conjunction with suitable solid, inert materials acting as binders. For that purpose, oxides of silica, alumina, titanium, magnesium and zirconium oxides, types, taken either individually or combined with one another, result to be suitable. The catalyst and the binder can be mixed in weight ratios comprised within the range of from 30:70 to 90:10 and preferably of from 50:50 to 70:30. Both components can be compacted (bonded) in any desired end shapes, e.g., as extruded bodies, or pellets.

The catalysts obtained by means of the process according to the present invention can be activated by drying and/or reduction, preferably by drying and subsequent reduction. The drying is carried out under an inert atmosphere at a temperature comprised within the range of from 100° to 400° C., and the reduction is carried out by submitting the sample to thermal treatment under a reducing atmosphere, at a temperature comprised within the range of from 150° to 500° C.

The process according to the present invention is much more advantageous than the process for preparing the same catalyst disclosed in U.S. patent application Ser. No. 08/099, 650 filed on Jul. 30, 1993. In fact, the process according to the present invention consists of one single step for preparing the of Group VIIIA metal-containing gel. On the contrary, according to the above cited Italian patent application, a silica-alumina gel is first prepared and subsequently the metal is incorporated into it by means of exchange or impregnation techniques.

The catalyst prepared according to the above reported technique, either as such or bonded with an inert material, is active in the hydroisomerization process, which can be carried out either continuously or batchwise.

The hydroisomerization is suitably carried out in the presence of $H_2$, at a temperature comprised within the range of from 200° to 540° C., preferably of from 250° to 450° C., and under a pressure which may range from the atmospheric pressure up to 25,000 kPa, preferably of from 4,000 to 10,000 kPa.

The effective catalyst amount, as weight percent based on the n-paraffin or on the mixtures of n-paraffins to be hydroisomerized, is generally comprised within the range of from 0.5 to 30% by weight, preferably of from 1 to 15% by weight.

The following experimental examples are reported in order to better explain the present invention.

EXAMPLE 1

0.68 g of aluminum isopropoxide is dissolved in 66.39 g of an aqueous solution of TPA-OH at 13.35% by weight/ weight, heated at 60° C. To the clear solution, 0.62 ml of $Pt(NH_3)_4(OH)_2$ (8.07% of Pt by weight/weight) and finally 34.72 g of TES are added. The resulting mixture contains the following molar ratios:

$SiO_2:Al_2O_3=100$, $TPA\text{-}OH:SiO_2=0.10$, $H_2O:SiO_2=21$ and $Pt:SiO_2=0.0015$.

By keeping this mixture with stirring at 60° C. for 40 minutes, a homogeneous gel is formed which is dried under vacuum at 110° C. for 4 hours and then is calcined at 300° C. for 3 hours under a flowing nitrogen stream and subsequently at 500° C. for 3 hours under a flowing air stream, with a temperature ramp from 23° to 300° C., of 30 minutes.

An X-ray amorphous silica, alumina and Pt gel is obtained in a quantitative yield relatively to the initially charged materials.

The characteristics of this catalyst are reported in Table 1.

EXAMPLE 2

A catalyst in which the metal phase is constituted by Pd, is prepared according to Example 1.

0.68 g of aluminum isopropoxide is dissolved in 66.39 g of an aqueous solution of TPA-OH at 13.35% by weight/ weight, heated at 60° C. To the clear solution, 0.0536 g of $Pd(CH_3COO)_2$ and finally 34.72 g of TES are added. The resulting mixture contains the following molar ratios:

$SiO_2:Al_2O_3=100$, $TPA\text{-}OH:SiO_2 0.10$, $H_2O:SiO_2=21$ and $Pd:SiO_2=0.0014$.

By keeping this mixture with stirring at 60° C. for 40 minutes, a homogeneous gel is formed which is dried under vacuum at 110° C. for 4 hours and then is calcined at 300° C. for 3 hours under a flowing nitrogen stream and subsequently at 500° C. for 3 hours under a flowing air stream, with a temperature ramp from 23 to 300° C., of 30 minutes.

An X-ray amorphous silica, alumina and Pd gel is obtained in a quantitative yield relatively to the initially charged materials.

The characteristics of this catalyst are reported in Table 1.

EXAMPLE 3

A catalyst containing a smaller amount of Pt i s prepared according to Example 1.

0.68 g of aluminum isopropoxide is dissolved in 66.39 g of an aqueous solution of TPA-OH at 13.35% by weight/ weight, heated at 60° C. To the clear solution, 0,31 ml of $Pt(NH_3)_4(OH)_2$, (8.07% of Pt by weight/weight) and finally 34.72 g of TES are added. The resulting mixture contains the following molar ratios:

$SiO_2:Al_2O_3=100$, $TPA\text{-}OH:SiO_2=0.10$, $H_2O:SiO_2=21$ and $Pt:SiO_2=0.0008$.

By keeping this mixture with stirring at 60° C for 40 minutes, a homogeneous gel is formed which is dried under vacuum at 110° C. for 4 hours and then is calcined at 300° C. for 3 hours under a flowing nitrogen stream and subsequently at 500° C. for 3 hours under a flowing air stream, with a temperature ramp from 23° to 300° C., of 30 minutes.

An X-ray amorphous silica, alumina and Pt gel is obtained in a quantitative yield relatively to the initially charged materials.

The characteristics of this catalyst are reported in Table 1.

EXAMPLE 4

A catalyst in which the acidic function is modified by varying the ratio of $SiO_2:Al_2O_3$ is prepared according to Example 1.

0.34 g of aluminum isopropoxide is dissolved in 66.39 g of an aqueous solution of TPA-OH at 13.35% by weight/weight, heated at 60° C. To the clear solution, 0.62 ml of $Pt(NH_3)_4(OH)_2$, (8.07% of Pt by weight/weight) and finally 34.72 g of TES are added. The resulting mixture contains the following molar ratios:

$SiO_2:Al_2O_3=200$, $TPA\text{-}OH:SiO_2=0.10$, $H_2O:SiO_2=21$ add Pt: $SiO_2=0.0015$.

By keeping this mixture with stirring at 60° C. for 40 minutes, a homogeneous gel is formed which is dried under vacuum at 110° C. for 4 hours and then is calcined at 300° C. for 3 hours under a flowing nitrogen stream and subsequently at 500° C. for 3 hours under a flowing air stream, with a temperature ramp from 23 to 300° C., of 30 minutes.

An X-ray amorphous silica, alumina and Pt gel is obtained in a quantitative yield relatively to the initially charged materials.

The characteristics of this catalyst are reported in Table 1.

EXAMPLE 5

A catalyst in which the acidic function is modified by varying the ratio of $SiO_2:Al_2O_3$ is prepared according to Example 2.

0.34 g of aluminum isopropoxide is dissolved 66.39 g of an aqueous solution of TPA-OH at 13.35% by weight/weight, heated at 60° C. To the clear solution, 0.0536 g of $Pd(CH_3COO)_2$ and finally 34.72 g of TES are added. The resulting mixture contains the following molar ratios:

$SiO_2:Al_2O_3=200$, $TPA\text{-}OH:SiO_2=0.10$, $H_2O:SiO_2=21$ and $Pd:SiO_2=0.0014$.

By keeping this mixture with stirring at 60° C. for minutes, a homogeneous gel is formed which is dried under vacuum at 110° C. for 4 hours and then is calcined at 300° C. for 3 hours under a flowing nitrogen stream and subsequent at 500° C. for 3 hours under a flowing air stream, with a temperature ramp from 23 to 300° C., of 30 minutes.

An X-ray amorphous silica, alumina and Pd gel is obtained in a quantitative yield relatively to the initially charged materials.

The characteristics of this catalyst are reported in Table 1.

EXAMPLE 6

A catalyst in which the ratios of $SiO_2:Al_2O_3$ and $M:SiO_2$ are modified is prepared according to Example 2.

0.34 g of aluminum isopropoxide is dissolved in 66.39 g of an aqueous solution of TPA-OH at 13.35% by weight/weight, heated at 60° C. To the clear solution, 0.1072 g of $Pd(CH_3COO)_2$ and finally 34.72 g of TES are added. The resulting mixture contains the following molar ratios:

$SiO_2$ $.Al_2O_3=200$, $TPA\text{-}OH:SiO_2=0.10$, $H_2O:SiO_2=21$ and $Pd:SiO_2=0.0028$.

By keeping this mixture with stirring at 60° C. for 40 minutes, a homogeneous gel is formed which is dried under vacuum at 110° C. for 4 hours and then is calcined at 300° C. for 3 hours under a flowing nitrogen stream and subsequently at 500° C. for 3 hours under a flowing air stream, with a temperature ramp from 23° to 300° C., of 30 minutes.

An X-ray amorphous silica, alumina and Pd gel is obtained in a quantitative yield relatively to the initially charged materials.

The characteristics of this catalyst are reported in Table 1.

EXAMPLE 7

Comparison Example

A reference catalyst prepared which is constituted by an acidic silica and alumina carrier on which the metal phase is deposited by impregnation, as disclosed in U.S. patent application Ser. No. 08/099,650 filed on Jul. 30, 1993.

The material used as the acidic carrier is prepared as disclosed in U.S. Pat. No. 5,049,536.

2 g of aluminum isopropoxide is dissolved at room temperature in 68.5 g of an aqueous solution of tetrapropilammonium hydroxide (TPA-OH at 13.35% by weight/weight). The solution is heated to 60° C. and then 104.1 g of tetraethylsilicate (TES) is added. The resulting mixture shows the following molar ratios:

$SiO_2:Al_2O_3=102$, $TPA\text{-}OH:SiO_2=0.09$ and $H_2O:SiO_2=15$.

By keeping this mixture with stirring at 600° C. during 40 minutes, a homogeneous gel is formed, which is dried under a flowing air stream at 90° C. and then is calcined at 550° C. under a flowing nitrogen stream for 3 hours, and subsequently under a flowing air stream for a further 10 hours at the same temperature.

An X-ray amorphous silica-alumina gel is obtained in a quantitative yield based on the initially charged materials.

To 10 g of so obtained silica-alumina gel, charged to a crystallizer, 12.06 ml of an aqueous solution containing $H_2PtCl_6$ (0.45% by weight/volume) and HCl (0.6M) is added dropwise, with careful stirring. The reactants are allowed to stay into contact with each other for 16 hours, then water is evaporated off during 1 hour at the temperature of 60° C. in air, and then the sample is dried for 2 hours at 150° C., still in air. The calcination is carried out at 500° C. for 3 hours, under a flowing air stream, with the muffle being heated from 23° to 500° C. during 90 minutes.

The catalyst characterization data is reported in Table 1.

EXAMPLE 8

Comparison Example

The catalyst is prepared by operating on a same carrier as from Example 7, by applying an ion exchange method in order to deposit the metal phase.

To 10 g of amorphous silica-alumina, 80 ml of an aqueous solution of $Pt(NH_3)_4Cl_2$ (0.06% of Pt by weight/volume) is added together with some droplets of NH40H at 35% by weight, in order to adjust the pH value of the suspension at 9. The mixture is kept with stirring at room temperature for 1 hour, then is filtered and the filter cake is washed with water. After a 16-hour drying at 110° C. in air, the sample is calcined for 3 hours at 400° C. under a flowing air stream, with a temperature increase ramp from 23° to 400° C., of 30 minutes. The characteristics of this catalyst are reported in Table 1

EXAMPLE 9

Comparison Example

A catalyst is prepared by starting from the same carrier as of Example 7, with Pd being deposited by means of the ion exchange method.

10 g of carrier disclosed in Example 7 is added, with stirring, at room temperature, to 1,000 ml of demineralized water. 27.23 mL of $Pd(NH_3)_4 (NO_3)_2$ (0.01M) is slowly added, together with some drops of $NH_4OH$ at 35%, in order to adjust the suspension pH value at about 6; the reaction is kept with stirring at room temperature for 3 hours. The mixture is filtered, the filter cake is washed with water and is allowed to dry at room temperature. The end drying is carried out at a temperature of 80° C. in air during 3 hours, and the calcination is carried out at 250° C., for 3 hours, under a flowing air stream.

The characteristics of this catalyst are reported in Table 1. In this table, the average pore diameter is not reported; it results to be smaller than 30 Angstroms for all samples 1–9.

TABLE 1

| Catalyst | % Metal Content (W/W) | Surface area (m²/g) | $SiO_2:Al_2O_3$ (m/m) | Pore Volume (ml/g) |
|---|---|---|---|---|
| Example 1 | 0.51 | 858.46 | 100 | 0.44 |
| Example 2 | 0.25 | 889.29 | 100 | 0.44 |
| Example 3 | 0.25 | 723.82 | 100 | 0.44 |
| Example 4 | 0.50 | 1185.53 | 200 | 0.44 |
| Example 5 | 0.25 | 1343.34 | 200 | 0.44 |
| Example 6 | 0.50 | 1225.91 | 200 | 0.44 |
| Example 7 | 0.52 | 674.60 | 100 | 0.44 |
| Example 8 | 0.58 | 496.30 | 100 | 0.44 |
| Example 9 | 0.27 | 485.90 | 100 | 0.44 |

EXAMPLE 10

The catalyst from Example 1 was tested in the reaction of hydroisomerization of $n-C_{16}$ paraffin in a microautoclave, under the following conditions.

The microautoclave is constituted by a steel body and a cover provided with a plurality of valves for autoclave pressurizing, gas product venting and possible recovery, and with a pressure relief (safety) disc. The stirring system is constituted by a thin internal metal rod.

The reactor is charged with 8 g of $C_{16}$ paraffin and 0.25 g of catalyst. The system is pressurized, when cold, with $H_2$, at 5 MPa and then is heated up to the temperature of 360° C. Zero time is considered to be the time at which the internal reactor temperature reaches the desired value. When 120 minutes have elapsed, the reactor is cooled and vented and the reaction mixture is recovered. The analysis of the products in order to determine the conversion rate and the molecular species distribution is directly carried out on the mixture by gas-chromatography (HP-1 crosslinked methyl silicone gum column, atomic emission detector).

In Table 2, the conversion and selectivity rates, calculated as follows, are reported.

$$\text{Conversion of n-}C_{16} = 1 - \frac{\text{Unreacted n-}C_{16} \text{ peak area}}{\text{Total hydrocarbon peak area}}$$

$$\text{Selectivity to iso-}C_{16} = \frac{\text{Iso-}C_{16} \text{ product peak area}}{\text{Total product peak area}}$$

$$\text{Selectivity } C_{16^-} = \frac{C_{16^-} \text{ product peak area}}{\text{Total product peak area}}$$

wherein "iso-$C_{16}$" is the mixture of isomers containing 16 carbon atoms and "$C_{16^-}$" is the mixture of cracking products, containing less than 16 carbon atoms.

EXAMPLE 11

Comparison Example

A catalyst according to Example 7 is tested in the hydroisomerization of $n-C_{16}$ paraffins. The reaction conditions are kept equal to as of Example 10. The conversion and selectivity rate values are reported in Table 2.

EXAMPLE 12

A catalyst according to Example 2 is tested in the hydroisomerization of $n-C_{16}$ paraffins. The reaction conditions are kept equal to as of Example 10. The conversion and selectivity rate values are reported in Table 2.

EXAMPLE 13

Comparison Example

A catalyst according to Example 9 is tested in the hydroisomerization of $n-C_{16}$ paraffins. The reaction conditions are kept equal to as of Example 10. The conversion and selectivity rate values are reported in Table 2.

*TABLE 2

| Example | Conversion rate % | Selectivity to iso-$C_{16}$ | Selectivity to $C_{16^-}$ |
|---|---|---|---|
| 10 | 60.2 | 88.87 | 11.13 |
| 11 | 79.5 | 87.29 | 12.70 |
| 12 | 35.6 | 78.09 | 21.91 |
| 13 | 25.5 | 96.39 | 3.61 |

*Reaction conditions: t = 360° C., $P_{H2}$ = 5 MPa, n-$C_{16}$:catalyst = 8:0.25, t = 120 minutes From Example 10 (catalyst with Pt), one may see that the catalyst prepared according to the process of the present invention, when compared with the reference catalyst of Example 11, shows, with the other operating conditions being the same, a higher ratio of the selectivity rate to iso-Cl6 products, to the selectivity rate to cracking products.

On considering Examples 12 (catalyst with Pd) and 13, one may observe that the novel Pd-containing catalytic system yields better hydroisomerizing performance than as obtained with a reference catalyst. In particular, the yield of iso-$C_{16}$ products is higher than 10% by weight.

On considering Examples 10 and 12, one may observe that with the molar ratio of M:$SiO_2$ being the same the Pt-containing catalyst yields a considerably higher conversion rate than as obtained with the Pd-based catalyst.

EXAMPLE 14

The catalyst according to Example 1 is tested in the hydroisomerization of $n-C_{16}$ paraffins. The reaction conditions are the same as in Example 10, except for the reaction time, which is extended to 240 minutes. The conversion and selectivity rate values are reported in Table 3.

EXAMPLE 15

The catalyst according to Example 3 is tested in the hydroisomerization of n-$C_{16}$ paraffins. The reaction conditions are the same as in Example 10. The conversion and selectivity rate values are reported in Table 3.

EXAMPLE 16

The catalyst according to Example 4 is tested in the hydroisomerization of n-$C_{16}$ paraffins. The reaction conditions are the same as in Example 10. The conversion and selectivity rate values are reported in Table 3.

EXAMPLE 17

The catalyst according to Example 5 is tested in the hydroisomerization of n-$C_{16}$ paraffins. The reaction conditions are the same as in Example 10. The conversion and selectivity rate values are reported in Table 3.

EXAMPLE 18

A catalyst according to as from Example 4 is tested in the hydroisomerization n-$C_{28}$ of paraffins. The reaction conditions are kept equal to those as of Example 16. The conversion and selectivity rate values are reported in Table 3.

EXAMPLE 19

A catalyst according to as from Example 4 is first activated under hydrogen at 400° C. and subsequently is tested in the hydroisomerization of n-$C_{16}$ paraffins. The reaction conditions are kept equal to those as of Example 15. The conversion and selectivity rate values are reported in Table 3.

TABLE 3

| Example | Conversion rate % | Selectivity to iso products | Selectivity to cracked products |
|---|---|---|---|
| 10 | 60.20 | 89.04 | 11.13 |
| 14* | 82.89 | 73.76 | 26.24 |
| 15 | 48.20 | 79.05 | 21.16 |
| 16 | 78.30 | 88.51 | 11.44 |
| 17 | 44.40 | 78.81 | 21.62 |
| 18+ | 54.30 | 92.99 | 7.01 |
| 19 | 79.60 | 86.43 | 13.57 |

Reaction conditions: T = 360° C., t = 120 minutes, $P_{H2}$ = 5MPa, n-$C_{16}$:catalyst = 8:0.25.
*t = 240 minutes; + substrate = n-$C_{28}$ From Examples 10 and 14, one may observe that doubling the test time actually causes an increase in conversion rate, to the damage of selectivity rate to $C_6$ isomers.

On considering Examples 10 and 15, one may observe that by halving the amount of Pt (hydro-dehydrogenating function), the overall performance of the catalyst is jeopardized.

On considering Examples 10 and 12 (catalysts with ratio of $SiO_2$:$Al_2O_3$=100) and Examples 16 and 17 (catalysts with ratio of $SiO_2$:$Al_3$=200) one may observe that, with the operating conditions being the same, the reduction in the acidic function (higher $SiO_2$:$Al_2O_3$ ratio) increases the performance of the catalyst, with the conversion rate being considerably increased and the iso:cracking ratio remaining unchanged.

On considering the Examples 16 and 18, one may observe that when a substrate constituted by n-$C_{28}$ is used, a higher selectivity to isomerization products is obtained than as obtained by using an n-$C_{16}$ paraffin.

We claim:

1. A process for hydroisomerizing n-paraffins of more than 15 carbon atoms, comprising:

contacting an n-paraffin or n-paraffin mixture with a difunctional catalyst;

wherein said difunctional catalyst comprises:

(a) an X-ray amorphous silica-alumina gel with a molar ratio of $SiO_2$:$Al_2O_3$ in the range of from 30:1 to 500:1, with a porosity in the range of 0.3 to 0.6 ml/g, and with a prevailing pore diameter in the range of from 10 to 30 Å, and (b) one or more metals from Group VIIIA in an amount of from 0.05 to 5% by wt.

2. The process of claim 1, wherein said difunctional catalyst further comprises a binding agent.

3. The process of claim 1, wherein said contacting is carried out with 0.5 to 30% by wt., based on said n-paraffins, of said difunctional catalyst, at a temperature of 200°–540° C., and under a hydrogen pressure of atmospheric to 25,000 kPa.

4. The process of claim 2, wherein said contacting is carried out with 0.5 to 30% by wt., based on said n-paraffins, of said difunctional catalyst, at a temperature of 200°–540° C., and under a hydrogen pressure of atmospheric to 25,000 kPa.

5. The process of claim 3, wherein said contacting is carried out with 1–15% by wt., based on said n-paraffins, of said difunctional catalyst, at a temperature of 250°–450° C., and under a hydrogen pressure of 4,000 to 10,000 kPa.

6. The process of claim 4, wherein said contacting is carried out with 1–15% by wt., based on said n-paraffins, of said difunctional catalyst, at a temperature of 250°–450° C., and under a hydrogen pressure of 4,000 to 10,000 kPa.

7. The process of claim 1, wherein said one or more metals from Group VIIIA is selected from the group consisting of platinum and palladium.

8. The process of claim 2, wherein said one or more metals from Group VIIIA is selected from the group consisting of platinum and palladium.

* * * * *

UNITED STATES PATENT AND TRADEMARK OFFICE
CERTIFICATE OF CORRECTION

PATENT NO. : 5,608,134
DATED : March 4, 1997
INVENTOR(S) : Carlo PEREGO, et al.

It is certified that error appears in the above-indentified patent and that said Letters Patent is hereby corrected as shown below:

On the title page, Item [62], the Related U.S. Application Data is incorrect. It should read:

-- [62] Division of Ser. No. 124,203, Sep. 21, 1993, Pat. No. 5,444,032. --

Signed and Sealed this

Twenty-seventh Day of May, 1997

Attest:

BRUCE LEHMAN

*Attesting Officer*     *Commissioner of Patents and Trademarks*